US006827500B2

(12) United States Patent
Basavanhally et al.

(10) Patent No.: US 6,827,500 B2
(45) Date of Patent: Dec. 7, 2004

(54) PRECISION TWO DIMENSIONAL OPTICAL FIBER ARRAY

(75) Inventors: Nagesh R Basavanhally, Skillman, NJ (US); Cristian A Bolle, Bridgewater, NJ (US); Paul Robert Kolodner, Hoboken, NJ (US); Rene R Ruel, Bridgewater, NJ (US); John David Weld, Ledgewood, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 198 days.

(21) Appl. No.: 09/895,910

(22) Filed: Jun. 29, 2001

(65) Prior Publication Data

US 2003/0002818 A1 Jan. 2, 2003

(51) Int. Cl.[7] .................................................. G02B 6/36
(52) U.S. Cl. .............................. 385/80; 385/62; 385/87
(58) Field of Search ............................ 385/80, 81, 82, 385/85, 91, 62

(56) References Cited

U.S. PATENT DOCUMENTS

| | | | | |
|---|---|---|---|---|
| 5,032,718 A | | 7/1991 | Murakami | 250/227.2 |
| 5,346,583 A | * | 9/1994 | Basavanhally | 216/26 |
| 5,394,493 A | * | 2/1995 | Ames | 385/35 |
| 5,521,996 A | | 5/1996 | Ames et al. | 385/75 |
| 5,550,942 A | * | 8/1996 | Sheem | 385/53 |
| 5,566,262 A | * | 10/1996 | Yamane et al. | 385/33 |
| 5,675,680 A | | 10/1997 | Ames et al. | 385/54 |
| 6,078,714 A | * | 6/2000 | Cavanaugh | 385/115 |
| 6,328,482 B1 | * | 12/2001 | Jian | 385/88 |
| 6,396,995 B1 | * | 5/2002 | Stuelpnagel et al. | 385/136 |
| 6,478,606 B1 | * | 11/2002 | McNerney et al. | 439/415 |
| 6,587,618 B2 | * | 7/2003 | Raguin et al. | 385/33 |
| 6,595,698 B2 | * | 7/2003 | Gutierrez et al. | 385/85 |
| 2003/0021547 A1 | * | 1/2003 | Bolle | 385/82 |

FOREIGN PATENT DOCUMENTS

| | | | | |
|---|---|---|---|---|
| EP | 1271192 A1 | * | 1/2003 | G02B/6/08 |
| JP | 2003029074 A | * | 1/2003 | G02B/6/24 |

OTHER PUBLICATIONS

Yamaguchi, M., "High Density Digital Free–Space Photonic–Switching Fabrics Using Exciton Absorption Reflection–Switch (EARS) Arrays and Microbeam Optical Interconnections", IEEE Journal of Selected Topics in Quantum Electronics, vol. 2, No. 1, pp. 47–53, Apr., 1996.

* cited by examiner

Primary Examiner—Hae Moon Hyeon
(74) Attorney, Agent, or Firm—Eugene J. Rosenthal

(57) ABSTRACT

A precise fiber array is formed using a chuck to tightly hold as an array with hexagonal packing a group of precision ferrules into ones of which is inserted and bonded a fiber end. The bonding is typically performed by gluing the fiber into the ferrule. The ferrules may also be bonded to each other. Once the ferrules are bonded together, the chuck may be removed. The terminating end of the fibers may be polished. Alternatively, cleaved terminating fiber ends may be employed, with the various terminating ends being coordinated, e.g., by an optical flat. The ferrules may have a tip and a conical entrance. The chuck may hold the ferrules in a straight orientation. The fiber terminating faces of all of the ferrules may be substantially coplanar. The ferrules may be arranged in a hexagonal configuration.

27 Claims, 5 Drawing Sheets

PRECISION TWO DIMENSIONAL OPTICAL FIBER ARRAY

TECHNICAL FIELD

This invention relates to the art of optical fiber arrays, and to methods for making same.

BACKGROUND OF THE INVENTION

It is often desirable to have very precise two-dimensional arrays of optical fibers e.g., for use with an all optical switch. In particular, for single-mode optical fiber as is typically used in optical communications networks, such fiber often having a core with a diameter of 6–9 microns and a cladding with a diameter of 125 microns, positional tolerances of less than 2 microns from true position and angular tolerances of less than 0.5 degrees are required for each fiber in the fiber arrays. In the prior art, fiber arrays were made by fabricating a plate into which holes are made, and an individual fiber end is inserted into each hole. The plates may be made from a variety of materials, with silicon or a ceramic being preferred when a very precise array is required. The holes may be made by etching or drilling into the plate, using either mechanical techniques or through the use of a laser. The individual fiber ends are locked into place, e.g., with a small amount of glue. After that, the remaining fiber stubs protruding from the front of the plate are cut off, and the resulting ends are polished flat.

Unfortunately, the plates that can be made are usually rather thin, due to limitations in the technology for the plates and their holes. Such a thin plate is able to provide only a rather short guide and hold for each fiber so that, disadvantageously, the mechanical properties of the resulting fiber array is less than desirable. Further disadvantageously, the plates have to be custom-made, which usually requires special tools and expertise. Assembly of the array also requires special skills and precise fixtures. The polishing step at the end of the assembly is not trivial, and it is very time-consuming.

Also, in the prior art, fibers have been grouped in bundles for various purposes, e.g., by tying the fibers together or by grouping the fibers inside of a sleeve, e.g., in a fiber cable. However, such groupings do not provide precise alignment and spacing of the fibers at the exit from the bundle. Also, the maximum spacing is limited to the diameter of the individual fibers.

In "High-Density Digital Free-Space Photonic-Switching Fabrics Using Exciton Absorption Reflection-Switch (EARS) Arrays and Microbeam Optical Interconnections" by Masayasu Yamaguchi, Tsuyoshi Yamamoto, Katsuhiko Hirabayashi, Shinji Matsuo, and Kunio Kobayu published in the IEEE Journal of Selected Topics in Quantum Electronics, Vol. 2, No. 1, April 1996, describes a 2-D fiber array consisting of stacked microglass ferrules arranged with a square packing using zirconia plates and brass frames. Disadvantageously, the fiber positional reproducibility achievable, i.e., the average displacement of the fiber centers from the desired grid points, is ±3.1 $\mu$m, and the fiber misorientation is 4 degrees on average. Such a fiber array does not meet the stringent requirements of current MEMS-based optical switches, such as the Lambda Router from Lucent Technologies, which requires that the fiber positional reproducibility be no more than ±2 $\mu$m and that the angular misorientation be no greater than 0.5 degrees on average.

There is a children's project in the prior art that involves hollow cylindrical beads which may be hexagonally arranged using a form that has protruding pins, one pin for each bead. The beads are held together by first ironing the side of the beads opposite to the form, then removing the beads from the form and ironing the side of the beads that had been adjacent to the form. Such beads are not precisely spaced, or aligned and they become deformed when they are ironed. This children's project is unrelated to optical fiber in any way.

SUMMARY OF THE INVENTION

We have recognized that, in accordance with the principles of the invention, a precise fiber array may be formed by employing a precise array of ferrules arranged with a hexagonal packing structure into ones of which is inserted and bonded, e.g., glued, a fiber end. We have further recognized that the target array, e.g., the array of micro mirrors on a corresponding MEMS device such as is employed in the Lucent Lambda Router, or other detectors or source arrays, will have to be configured to be hexagonal so as to correspond to the hexagonal fiber array. In one embodiment of the invention, a chuck is employed, at least initially, to tightly hold as an array a group of precision ferrules. Thereafter, a fiber end is inserted and bonded into ones of the ferrules. The ferrules may also be bonded to each other. If so, once the ferrules are bonded together, the chuck may be removed. Advantageously, such arrays of optical fibers may be manufactured to very high tolerances so as to be useful in positioning fiber arrays for all-optical switching. More specifically, the fiber positional reproducibility, i.e., the average displacement of the fiber centers from the desired grid points is no more than ±2 $\mu$m and the angular misorientation is no greater than 0.5 degrees on average.

The terminating end of the fibers may be polished. Alternatively, previously cleaved terminating fiber ends may be employed, with the various terminating ends being coordinated, e.g., by an optical flat or other surface which is placed at, or adjacent to, the fiber terminating end of the ferrule array.

The ferrules employed may be conventional off-the-shelf ceramic ferrules which have low cost. Such ferrules are manufactured to very tight tolerances. More specifically, it is well established that the precision ferrules a) can be manufactured substantially uniformly, so as to have only a very small error in their diameter from the prescribed nominal ferrule diameter; b) have only a very small error, from the prescribed nominal diameter, in the diameter of the hole which runs through the ferrule and is substantially precisely in the center of the ferrule, and c) are longer than the thickness of the prior art face plates so that mechanical support superior to that achieved using such prior art faceplate arrangements is achieved. Advantageously, the precision fiber arrays of the invention scale well so that precision fiber arrays with a large number of fibers and which meet the strict Lambda Router quality requirements can be inexpensively manufactured.

In one embodiment of the invention the ferrules have one end which is at least somewhat pointed, i.e., a tip, and a conical entrance to the hole at the end opposite to the pointed end. Advantageously, such an embodiment allows for easy insertion of the fiber end via the conical entrance and the pointed tip reduces the amount of polishing of the fiber end that needs to be done.

In accordance with an aspect of the invention, the chuck may be fabricated so that it holds the ferrules in a straight orientation or so that it holds the ferrules in an angled orientation. An angled orientation provides the advantage of reducing back reflection in the fiber. It is often desirable to ensure that the fiber terminating faces of all of the ferrules are substantially coplanar.

DETAILED DESCRIPTION

Figure 1:
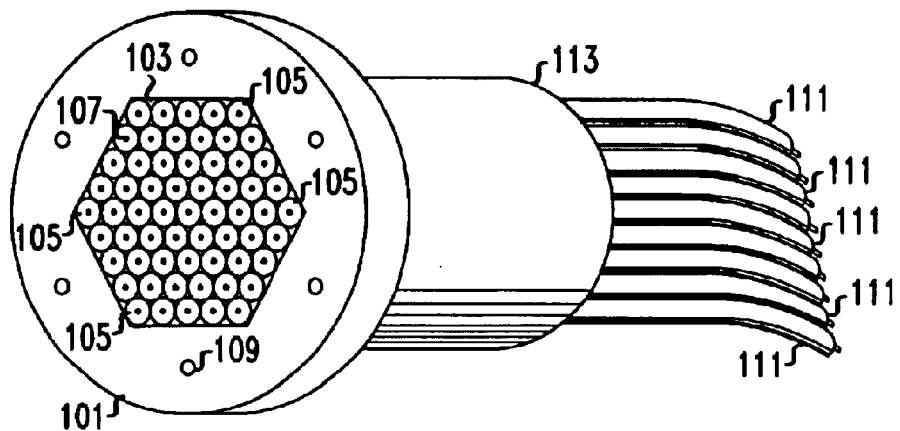
FIG. 1 shows a side view of a precise fiber array formed by employing a chuck to tightly hold as an array a group of precision ferrules into each of which is inserted and bonded a fiber, in accordance with the principles of the invention.

The following merely illustrates the principles of the invention. It will thus be appreciated that those skilled in the art will be able to devise various arrangements which, although not explicitly described or shown herein, embody the principles of the invention and are included within its spirit and scope. Furthermore, all examples and conditional language recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

In the claims hereof any element expressed as a means for performing a specified function is intended to encompass any way of performing that function. The invention as defined by such claims resides in the fact that the functionalities provided by the various recited means are combined and brought together in the manner which the claims call for. Applicant thus regards any means which can provide those functionalities as equivalent as those shown herein.

Unless otherwise explicitly specified herein, the drawings are not drawn to scale.

Additionally, unless otherwise explicitly specified herein, any lens shown and/or described herein is actually an optical system having the particular specified properties of that lens. Such an optical system may be implemented by a single lens element but is not necessarily limited thereto. Similarly, where a mirror is shown and/or described what is actually being shown and/or described is an optical system with the specified properties of such a mirror, which may be implemented by a single mirror element but is not necessarily limited to a single mirror element. This is because, as is well known in the art, various optical systems may provide the same functionality of a single lens element or mirror but in a superior way, e.g., with less distortion. Furthermore, as is well known in the art, the functionality of a curved mirror may be realized via a combination of lenses and mirrors and vice versa. Moreover, any arrangement of optical components that are performing a specified function, e.g., an imaging system, gratings, coated elements, and prisms, may be replaced by any other arrangement of optical components that perform the same specified function. Thus, unless otherwise explicitly specified here, all optical elements or systems that are capable of providing specific function within an overall embodiment disclosed herein are equivalent to one another for purposes of the present disclosure.

The term micro-electromechanical systems (MEMS) device as used herein is intended to mean an entire MEMS device or any portion thereof. Thus, if a portion of a MEMS device is inoperative, or if a portion of a MEMS device is occluded, such a MEMS device is nonetheless considered to be a MEMS device for purposes of the present disclosure.

In the description, identically numbered components within different ones of the FIGS. refer to the same components.

FIG. 1 shows a side view of a precise fiber array formed by employing a chuck to tightly hold as a hexagonal array a group of precision ferrules into each of which is inserted and bonded a fiber, in accordance with the principles of the invention. Note that by a "chuck" it is meant herein to include any device capable of holding the ferrules in a desired array shape with a requisite spacing and hexagonal packing at least at one point through the course of manufacture or completion of the array. More specifically, shown in FIG. 1 is chuck 101 which has a hexagonal hole 103 into which are inserted precision ferrules 105. Within respective ones of holes 107 are inserted respective ends of ones of optical fibers 111. Within the face of chuck 101 can be seen optional mounting holes 109.

Chuck 101 holds ferrules 105 in place initially at least through the use of pressure. One method of assembling ferrules 105 within chuck 101 is to insert most of ferrules 105 within hole 103 of chuck 101. Chuck 101 is then heated, so that it expands sufficiently to enable insertion of the rest of ferrules 105 within hole 103. The rest of ferrules 105 are then inserted within hole 103, and chuck 101 is then allowed to cool down. Upon cooling, chuck 101 contracts sufficiently to exert the necessary pressure on ferrules 105. Note that in heating chuck 101 typically ferrules 105 are also heated and expand in size. However, ferrules 105 are made from a material, e.g., ceramic, which expands less for the same change in temperature as does chuck 101, which is typically metal or plastic. Thus, it becomes possible to insert the remaining ferrules. The tolerances of the outside dimensions of the ferrules employed are very high, e.g., they may be on the order of one half of a micron, and the differences in size between hole 103 and the ferrule array is very small, e.g., less than two microns, yet the difference in size resulting from thermal expansion is sufficient to insert the remaining ferrules.

After the ends of fibers 111 are inserted into ferrules 105, glue may be employed to both hold the fibers within the ferrules as well as glue the ferrules to each other and to chuck 101. Furthermore, coupled to chuck 101 is optional strain relief sleeve 113, through which the optical fibers 111 pass. Fibers 111 are optionally encased in glue within strain relief sleeve 113, which couples the fibers to each other and to strain relief sleeve 113. Such glue provides strain relief for fibers 111. Note that fibers 111 may be encased in glue and after the glue dries any mold used for shaping the glue may be removed.

Optical fibers 111 are terminated at the end of holes 107 that are furthest from strain relief sleeve 113. Optical fibers 111 are each typically arranged to terminate substantially coplanar with the end of the one of ferrules 105 through whose hole it passes. This may be achieved by polishing the fiber until it is coplanar with the ferrule end, i.e., polishing the fiber down to the ferrule. Typically also, the end of the ferrule is polished as well. In practice, all the fibers are typically polished as part of a single manufacturing step, so they are all polished to be coplanar with each other and the face of the chuck.

In other embodiments of the invention, the polishing may be performed to achieve a shape other than flat for the face of the fiber array.

Alternatively, each of optical fibers 111 are arranged to terminate substantially coplanar with the end of the one of ferrules 105 by inserting a cleaved fiber end into the ferrule hole and employing an optical flat at the fiber terminating end to line up the fiber end and the ferrule end.

Unlike when polishing is used, when cleaved fibers are used, it is necessary to protect the cleaved fiber ends from the mass of glue that is used to couple the fibers to each other and to optional strain relief sleeve 113. To this end, when the fibers are lined up by the optical flat, only a very small drop of glue is used to hold the fibers in place, the glue being placed somewhat away from the fiber's cleaved end when the fiber is inserted into the ferrule. Once all the fibers are initially glued in position, a soluble protective layer is applied from the front to protect the fibers. Thereafter, the glue is applied from the back to couple the fibers to each other and to optional strain relief sleeve 113. After the glue dries, the soluble protective layer is dissolved using an appropriate solvent.

Use of cleaved fibers does permit arrangements where the fiber sticks out somewhat beyond the face of the ferrule. Thus, if a shape other than flat is desired, the inverse of the desired shape may be used in lieu of the optical flat. Furthermore, whether polishing or a surface-lining-up technique is employed, it is possible to arrange the front surface profile of the ferrules, e.g., by using a removable three-dimensional profile, so that when the ferrules are held by chuck 101 they maintain the shape of the profile.

Reinforcing sleeve 113 may be a separate component coupled to chuck 101, e.g., by gluing or other mechanical coupling, or reinforcing sleeve 113 may be integrated with chuck 101 to form a single unit. The advantage of reinforcing sleeve 113 being separate from chuck 101 is that it enables chuck 101 to have a thickness on the order of the length of ferrules 105, which enables easy access to the back of ferrules 105 to facilitate insertion of the ends of fibers 111 into holes 107 during manufacturing.

Optional mounting holes 109 may be used for various purposes such as 1) to mount the fiber array to a housing, 2) to hold the fiber array during polishing, or 3) to attach reinforcing sleeve 113 to chuck 101.

Advantageously, such arrays of optical fibers may be manufactured to very high tolerances so as to be useful in positioning fiber arrays for all-optical switching. More specifically, the fiber positional reproducibility, i.e., the average displacement of the fiber centers from the desired grid points is no more than $\pm 2$ $\mu$m and the angular misorientation is no greater than 0.5 degrees on average.

Note that the target array, e.g., the array of micro mirrors on a corresponding MEMS device such as is employed in the Lucent Lambda Router, or other detectors or source arrays, will have to be configured to be hexagonal so as to correspond to the hexagonal fiber array.

Figure 2:
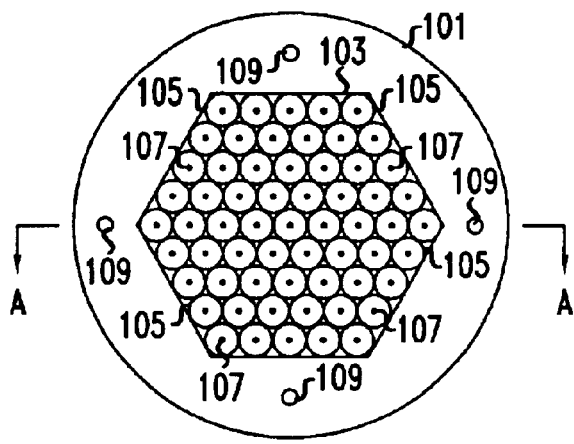
FIG. 2 shows a front view of the precise fiber array of FIG. 1.

FIG. 2 shows a front view of the precise fiber array of FIG. 1. Due to the nature of the view, optical fibers 111 cannot be seen in FIG. 2. The face of the precise fiber array in FIG. 2 is flat, either through the use of polishing or an optical flat.

Figure 3:
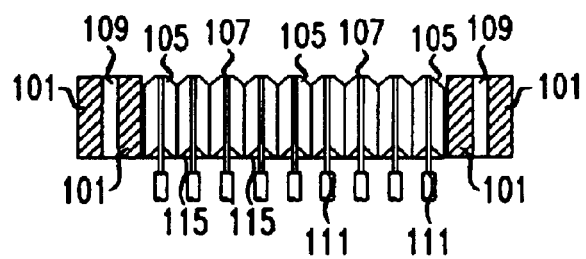
FIG. 3 shows a cross-sectional view of the precise fiber array along axis AA of FIG. 2.

FIG. 3 shows a cross-sectional view of the precise fiber array along axis AA of FIG. 2. The ends of fibers 111 can be seen in FIG. 3 within holes 107. Note that FIG. 3 shows nine (9) holes and nine (9) fibers 111. Optional conical entrances 115 are shown for holes 107.

Figure 4:
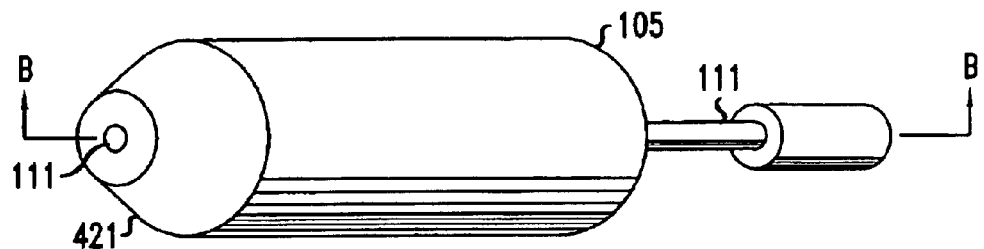
FIG. 4 shows one view of a typical prior art ferrule with a fiber end inserted therein.

FIG. 4 shows one view of a typical prior art ceramic ferrule 105 with one end of one of fibers 111 inserted therein. Ferrule 105 is oriented in FIG. 4 so that the end of the one of fibers 111 terminated in ferrule 105 can be seen at conical tip 421. Note that the tips need not necessarily be conical, although it may be advantageous for them to be conical.

Figure 5:
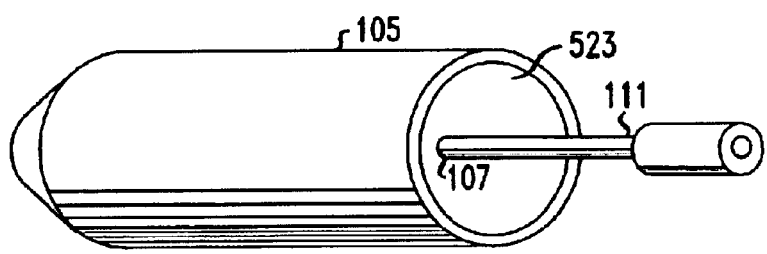
FIG. 5 shows another view of the typical prior art ferrule of FIG. 4 with one end of a fiber inserted therein.

FIG. 5 shows another view of the typical prior art ferrule 105 of FIG. 4 with one end of one of fibers 111 inserted therein. The ferrule is oriented in FIG. 4 so that conical entrance 523 of hole 107 can be discerned.

Figure 6:
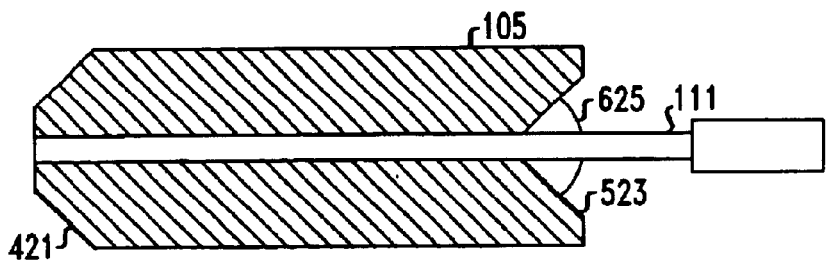
FIG. 6 shows a cross-sectional view along axis BB of the typical prior art ferrule of FIG. 4 with one end of a fiber inserted therein.

FIG. 6 shows a cross-sectional view along axis BB of the typical prior art ferrule 105 of FIG. 4 with an end of one of fibers 111 inserted therein. Conical tip 421 and conical entrance 523 can be seen in cross-section. Additionally, glue 625 is shown.

Figure 7:
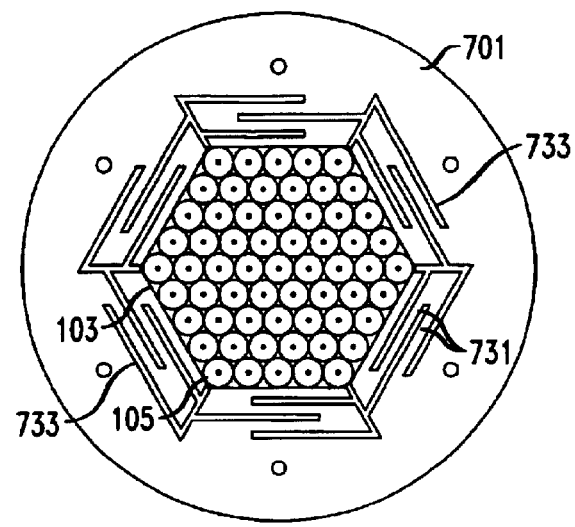
FIG. 7 shows a front view of another embodiment of a precise fiber array formed by employing a chuck to tightly hold as an array a group of precision ferrules into each of which is inserted and bonded a fiber end, and in accordance with the principles of the invention.

FIG. 7 shows a front view of another embodiment of a precise fiber array formed by employing a chuck to tightly hold as an array a group of precision ferrules 105 into each of which is inserted and bonded a fiber end of one of fibers 111, and in accordance with the principles of the invention. The precise fiber array of FIG. 7 is identical to that shown in FIG. 2 except for the substitution of chuck 701 for chuck 101. Chuck 701 is fabricated to incorporate within it flexible beams 731 which act as springs. Hole 103 is cut to be just slightly smaller than the array of ferrules 105. Inserting the ferrules forces the springs to displace slightly, causing expansion of hole 103. As a result, the springs exert a constant restorative force against the ferrules holding them securely together with the desired precise spacing and alignment.

In some embodiments of the invention, the restorative force is on the order of 20 pounds. However, the restorative force necessary will need to be determined by the implementer given the specific design and materials used. Those of ordinary skill in the art will be able to readily determine the appropriate amount of force.

The flexible beams may be made by employing electric discharge milling (EDM) to cut slots 733 through chuck 701.

Optionally, to improve performance of the array, a thin sheet of elastic material, e.g., a plastic or polyester such as Mylar®, which is a trademark of DuPont, or a polyimide, may be inserted between the walls making up hole 103 and the ones of ferrules 105 that abut the walls of hole 103. Doing so helps to even out any irregularities in the walls making up hole 103.

Figure 8:
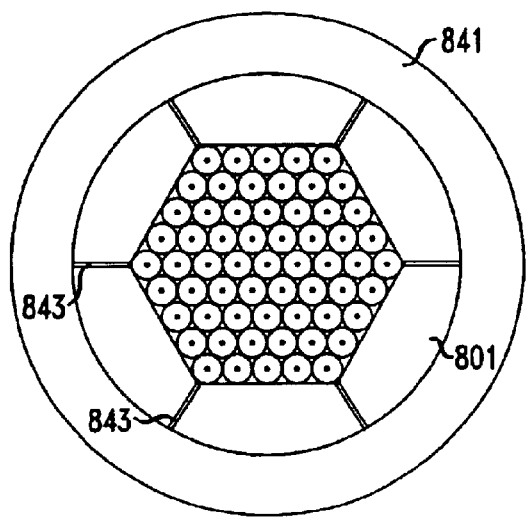
FIG. 8 shows a front view of another embodiment of a precise fiber array formed by employing a chuck to tightly hold as an array a group of precision ferrules into each of which is inserted and bonded an end of a fiber, in accordance with the principles of the invention.
Figure 9:
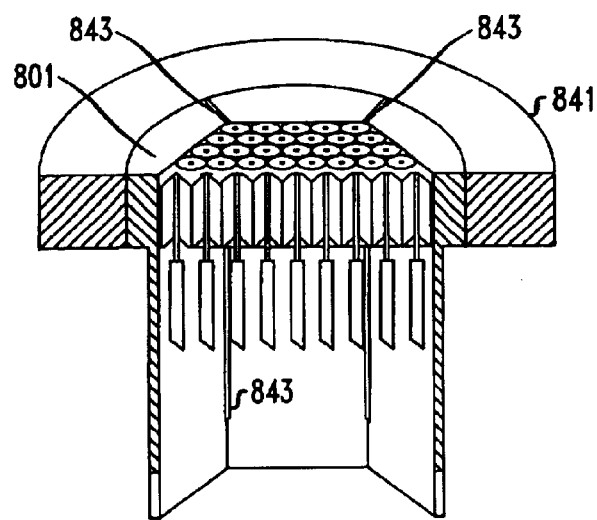
FIG. 9 shows another view of the embodiment of the invention shown in FIG. 8.

FIG. 8 shows a front view of another embodiment of a precise fiber array formed by employing a chuck to tightly hold as an array a group of precision ferrules into each of which is inserted and bonded an end of a fiber of fibers 111, in accordance with the principles of the invention. The precise fiber array of FIG. 8 is identical to that shown in FIG. 2 except for the substitution of chuck 801 for chuck 101 and the addition of clamping ring 841 around chuck 801. Slots 843 are cut in chuck 801. However, slots 843 do not go all the way through, so that at the bottom of chuck 801, which can't be seen in FIG. 8 but can be seen in FIG. 9, a complete ring of metal remains. Thus chuck 801 appears to be six flexible walls extending upward from a solid ring. Each of the flexible walls acts as a spring. Hole 103 is cut to be the same size as the array of ferrules 105. Clamping ring 841 is employed to apply pressure on the flexible walls of chuck 801 so as to keep the ferrule array in place.

Again, optionally, to improve performance of the array, a thin sheet of elastic material, e.g., a plastic or polyester such as Mylar®, which is a trademark of DuPont, or a polyimide, may be inserted between the walls making up hole 103 and the ones of ferrules 105 that abut the walls of hole 103. Doing so helps to even out any irregularities in the walls making up hole 103.

Figure 10:
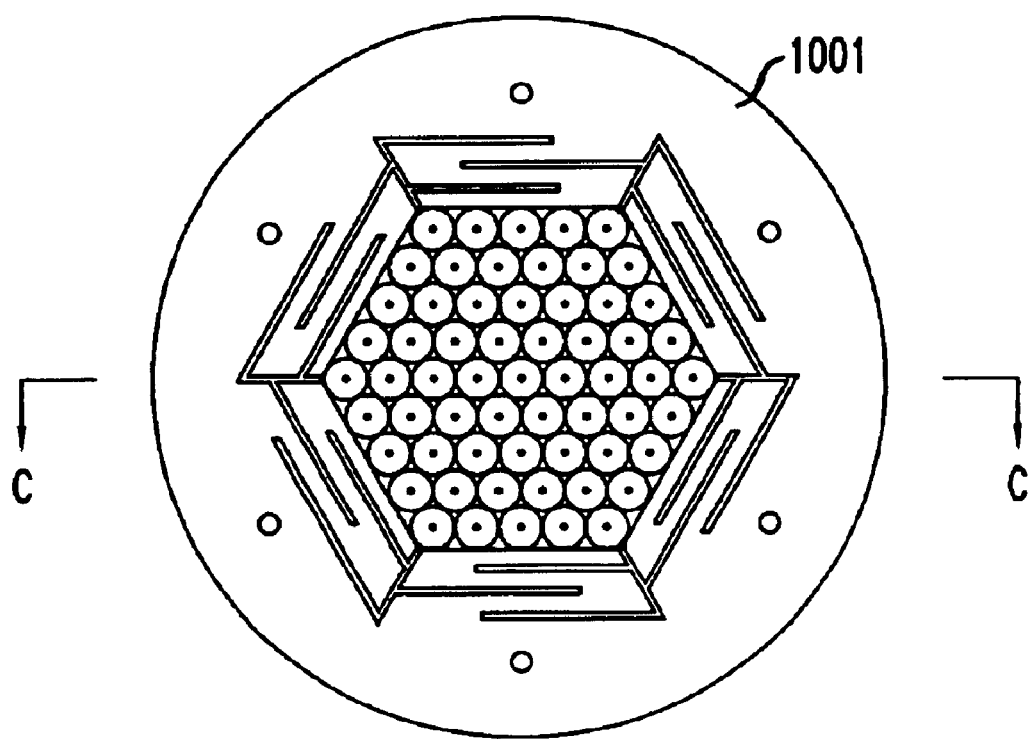
FIG. 10 shows a front view of another embodiment of a precise fiber array formed by employing a chuck to tightly hold as an array a group of precision ferrules into each of which is inserted and bonded an end of a fiber, in accordance with the principles of the invention.
Figure 11:
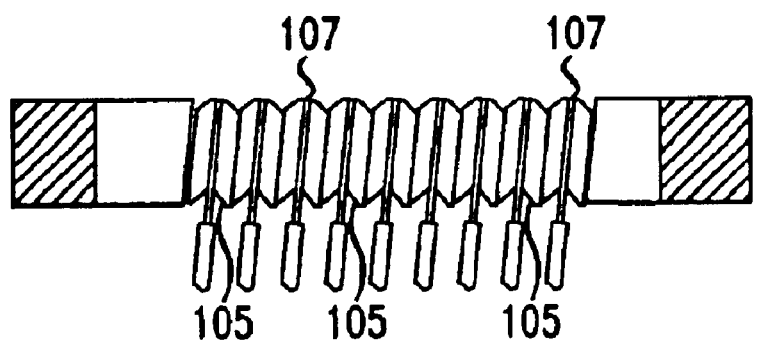
FIG. 11 shows a cross-sectional view of the embodiment of the invention shown in FIG. 10 along axis C—C of FIG. 10.

FIG. 10 shows a front view of another embodiment of a precise fiber array formed by employing a chuck to tightly hold as an array a group of precision ferrules into each of which is inserted and bonded an end of a fiber of fibers 111, in accordance with the principles of the invention. The precise fiber array of FIG. 10 is identical to that shown in FIG. 7 except that the walls of hole 103 are cut at an angle, in accordance with an aspect of the invention. The result of cutting of the walls at an angle can be seen in the cross-sectional view along axis C-C of FIG. 10 which is shown in FIG. 11. Since the walls are cut at an angle, all of ferrules 105, when placed within chuck 1001, are at the same angle, as are fibers 111 when they are inserted within ferrules 105. Once the face of the array is polished, the faces of the ends of fibers 111 are each oriented with the same angle. Advantageously, back reflection, i.e., the reflection of light at the end of the fiber back through the fiber due to a difference of the reflective index between the fiber and the material at its end, in each of fibers 111 is reduced.

Yet again, optionally, to improve performance of the array, a thin sheet of elastic material, e.g., a plastic or polyester such as Mylar®, which is a trademark of DuPont, or a polyimide, may be inserted between the walls making up hole 103 and the ones of ferrules 105 that abut the walls of hole 103. Doing so helps to even out any irregularities in the walls making up hole 103.

Figure 12:
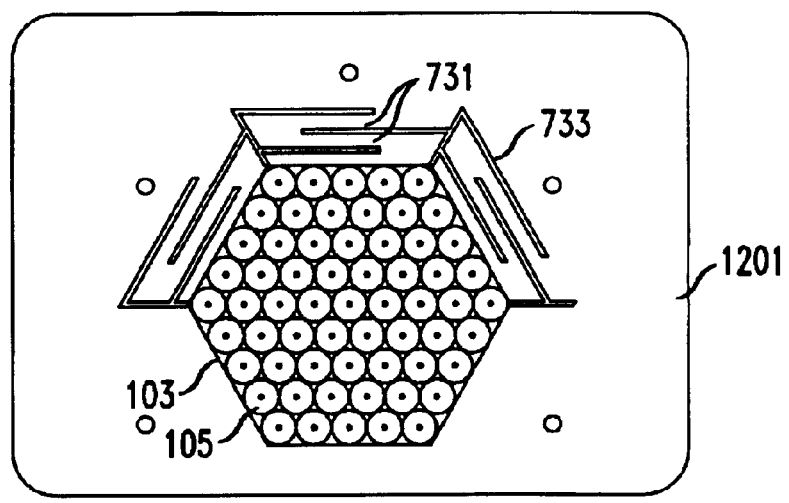
FIG. 12 shows a front view of an asymmetric embodiment of a precise fiber array formed by employing a chuck to tightly hold as an array a group of precision ferrules into each of which is inserted and bonded a fiber, in accordance with the principles of the invention.

FIG. 12 shows a front view of another embodiment of a precise fiber array formed by employing a chuck to tightly hold as an array a group of precision ferrules 105 into each of which is inserted and bonded a fiber, in accordance with the principles of the invention. The precise fiber array of FIG. 12 is identical to that shown in FIG. 7 except for the substitution of chuck 1201 for chuck 701. Chuck 1201 is of the same basic design as chuck 701, in that it is fabricated to incorporate within it flexible beams 731 which act as springs. However, chuck 1201 is asymmetrical in that the springs are formed only on one side. Furthermore, the wall thickness of chuck 1201 is not even all around.

Hole 103 is cut to be just slightly smaller than the array of ferrules 105. Inserting the ferrules forces the springs to displace slightly, causing expansion of hole 103. As a result, the springs exert a constant restorative force against the ferrules holding them securely together. The reduced number of springs, as compared with chuck 701, is still quite sufficient to adequately and precisely hold ferrules 105 in place. The advantage of using such an asymmetrical design is that one side can be made narrower than the other, so that it can be cleared by an optical beam that would otherwise have been intercepted by the additional chuck material.

As with the embodiment of FIG. 7 optionally, to improve performance of the array, a thin sheet of elastic material, e.g., a plastic or polyester such as Mylar®, which is a trademark of DuPont, or a polyimide, may be inserted between the walls making up hole 103 and the ones of ferrules 105 that abut the walls of hole 103. Doing so helps to even out any irregularities in the walls making up hole 103.

Figure 13:
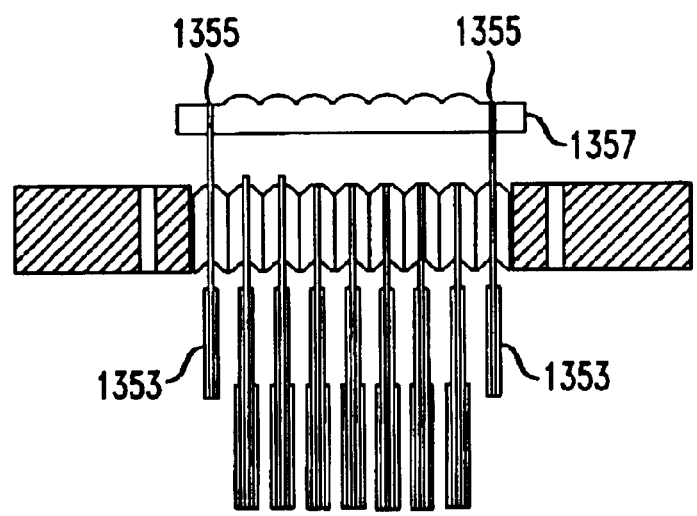
FIG. 13 shows alignment members extending to mate with alignment holes in precise fiber array in accordance with an aspect of the invention.

In lieu of containing optical fibers, some of ferrules 105 could be dedicated to containing alignment members, which may be pins, fibers, wires, or the like, which are used to align a further component or array, e.g., a lens array, an array of detectors, an array of micro machines, or the like, with the fiber array. To this end, each alignment member must protrude from the face of the array so that it may be extended into a corresponding hole in the further array. A cross section of such an alignment arrangement is shown in FIG. 13, which shows alignment members 1353 extending to mate with alignment holes 1355 of further array 1357.

Similarly, one or more of ferrules 105 need not contain any fibers. Such ferrules may be employed to receive some type of alignment member to align a further component or array. Furthermore, ferrules need not be round, and they may have more than one hole.

Although the chuck has been shown to be round in most of the embodiments, this need not be so. Any other shape desired may be used for the chuck. Furthermore, although the interior hole of the chuck has been shown to be hexagonal, those of ordinary skill in the art will readily appreciate that any other shape desired may be employed as well, so long as the hexagonal packing of the ferrules is maintained.

Those of ordinary skill in the art will readily appreciate that spring designs other than those explicitly depicted herein may be employed by applying the principles of the invention.

Note that although chuck has been shown remaining as part of the final array, even when the ferrules are bonded to each other through the use of glue. However, if the ferrules are bonded together, thereafter the chuck may be removed.

What is claimed is:

1. An apparatus, comprising
   a chuck;
   a plurality of precision ferrules, each having at least one hole therethrough;
   a plurality of optical fibers;
   wherein said chuck holds said precision ferrules in an array with hexagonal packing and an end of each of said fibers is bonded within a respective one of said holes; and
   at least one additional ferrule having at least one hole therethrough that does not have bonded therein a fiber end; and
   wherein said hole of said at least one additional ferrule that does not have an optical fiber bonded therein is adapted to align said apparatus to a further device to which said apparatus is coupled.

2. The invention as defined in claim 1 wherein said apparatus is optically coupled to a corresponding other hexagonally packed array.

3. The invention as defined in claim 2 wherein said other hexagonally packed array is one of the group consisting of a micro electromechanical system (MEMS) having a hexagonal array of micro mirrors, a hexagonally packed array of photo detectors, a hexagonally packed array of light sources.

4. The invention as defined in claim 1 wherein said chuck is fabricated to include at least one flexible member.

5. The invention as defined in claim 1 wherein said holes of said ferrules have an average deviation from the correct positions of less than 3 $\mu$m.

6. The invention as defined in claim 1 wherein said holes of said ferrules have a collective displacement of less than 3 $\mu$m.

7. The invention as defined in claim 1 wherein said holes of said ferrules have an average angular misorientation of 3.9 or less degrees.

8. The invention as defined in claim 1 wherein said fibers are bonded within said holes using glue.

9. The invention as defined in claim 1 wherein said ferrules are arranged to be perpendicular to a face of said chuck.

10. The invention as defined in claim 1 wherein said ferrules are arranged at an angle to a face of said chuck.

11. The invention as defined in claim 1 wherein said chuck has a hexagonal opening within which said precision ferrules are held in said array with hexagonal packing.

12. The invention as defined in claim 1 wherein at least one of said ferrules has an end with a conical tip.

13. The invention as defined in claim 1 wherein at least one hole of said ferrules has at least one conical entrance.

14. The invention as defined in claim 1 wherein each of a subset of at least two of said fibers has a terminating end that is substantially flush with one end of the one of said ferrules into which said fiber is inserted, and said terminating end of all of fibers said subset being substantially coplanar.

15. The invention as defined in claim 14 wherein at least one of said fibers has a terminating end that not is substantially coplanar with said terminating ends of said subset of said fibers.

16. The invention as defined in claim 1 wherein said precision ferrules are at least two millimeters long.

17. The invention as defined in claim 1 wherein said precision ferrules are ceramic.

18. The invention as defined in claim 1 further comprising a layer of a non-rigid material interposed between said chuck and said ferrules that abut said chuck, said material being non-rigid with respect to said chuck and said ferrules.

19. The invention as defined in claim 18 wherein said non-rigid material is at least one of the group consisting of plastic, polyester, polyimide.

20. The invention as defined in claim 1, wherein said at least one additional ferrule contains an alignment member protruding therefrom.

21. The invention as defined in claim 1 further comprising a reinforcing sleeve coupled to said chuck.

22. The invention as defined in claim 1 further comprising a reinforcing sleeve integrated with said chuck.

23. The invention as defined in claim 1 further comprising glue in the interstices between said ferrules which acts to couple said ferrules to each other.

24. The invention as defined in claim 1 wherein a face of said apparatus at which said ends of said fibers protrudes is polished.

25. The invention as defined in claim 1 wherein said fibers are cleaved fibers.

26. The invention as defined in claim 1 wherein said chuck has mounting holes within it which are adapted for mounting said apparatus to a further device to which said apparatus is coupled.

27. A method for making a precision fiber array, the method comprising the steps of:
    securing a plurality of precision ferrules arranged with hexagonal packing in a chuck, each of said ferrules having at least one hole therethrough;
    inserting a respective optical fiber end into the hole of each of a plurality, but less than all, of said ferrules; and
    bonding each of said optical fiber ends to its respective one of said plurality of ferrules;
    wherein said hole of at least one of said ferrules that does not have an optical fiber bonded therein is adapted to align said precision fiber array to a further device to which said precision fiber array is coupled.

* * * * *